Aug. 16, 1966

C. A. HACKETT ETAL 3,266,648

SLAG POT CARRYING VEHICLE

Filed April 16, 1964

INVENTOR.
Clarence A. Hackett and
Kenneth J. Hackett
BY
Bean, Brooks, Buckley & Bean
ATTORNEYS.

United States Patent Office 3,266,648
Patented August 16, 1966

3,266,648
SLAG POT CARRYING VEHICLE
Clarence A. Hackett, Kenmore, and Kenneth J. Hackett, Tonawanda, N.Y., assignors to Clarence A. Hackett, Inc., Tonawanda, N.Y.
Filed Apr. 16, 1964, Ser. No. 360,200
15 Claims. (Cl. 214—300)

The present invention relates to an improved vehicle of the type which is used to transport a slag pot.

In the making of steel, it is necessary to periodically dispose of the slag formed in the furnace. In the past, slag disposal has been a problem, but this problem has become more acute with the advent of basic oxygen furnaces which require the slag to be drawn from the furnace more frequently than with other types of furnaces. This flowable slag is poured into a pot, which with its slag contents is a massive load which may weigh as much as 100 tons, and the pot is transported to a disposal area which is remote from the furnace, where it is dumped. By this procedure, the immediate area surrounding the furnace is kept clear of dumped slag.

Various types of vehicles have been employed in the past for the disposal of slag in the foregoing manner. Railway cars were subject to the shortcoming of requiring a high capital expenditure. In addition railways cars were limited to a given route, as determined by the path of the tracks, and every time a new dumping area was selected, a new track was required. Automotive types of pot carrying vehicles which were used had solid hard tires which were extremely destructive of the roadways on which they were used. The solid hard tires were required because there was no known way of carrying the massive slag loads on pneumatic tires without rupturing them. It is with the providing of an improved pot carrying vehicle which is not subject to the foregoing shortcomings that the present invention is concerned.

It is accordingly one important object of the present invention to provide an improved slag pot carrying vehicle, which by supporting the massive load of a slag pot and its contents in a unique manner both in transit and during dumping, can employ rubber pneumatic tires, which not only cushion the slag pot and cause the vehicle to be highly maneuverable in transit, but also do not destroy roadways.

Another object of the present invention is to provide an improved slag pot carrying vehicle which holds a slag pot in an extremely stable manner during transit but which permits the slag pot to become unbalanced and therefore be self-tilting during dumping to thereby enhance the ease with which its massive load may be dumped.

A further object of the present invention is to provide an improved pot carrying vehicle which employs a unique pot supporting linkage which insures that the molten slag cannot be poured onto the rubber pneumatic tires during dumping. Other objects and attendant advantages of the present invention will readily be perceived hereafter.

The improved slag pot carrying vehicle of the present invention includes a tractor and a pot carrying trailer, both having rubber pneumatic tires which enhance the maneuverability of the vehicle and do not destroy the roadways. During the loading of the slag pot and while the vehicle is in transit, the pot occupies a relatively central position on the trailer so that its massive load is distributed to both the front and rear wheels of the vehicle. Such load distribution prevents either the front or rear tires from being overloaded because the front wheels share the load with the rear wheels. Furthermore, the load on the front wheels increases the traction of the tractor. When the vehicle reaches the remote dumping area, the pot is moved from its central location to a position at the rear of the vehicle. However, an auxiliary supporting arrangement is provided on the trailer for preventing the load of the pot from being exerted entirely on the rear pneumatic tires during dumping, thus preventing the tires from bursting. When the pot reaches its dumping position, it becomes unbalanced because of the manner in which its supporting linkage is constructed so that it will tilt to a dumping attitude because of its own weight, notwithstanding that the supporting linkage caused it to be held in an extremely stable manner prior to the time that it reached the dumping position. The self-tilting action of the pot enhances the ease with which it can be dumped. Furthermore, as the pot tilts rearwardly during dumping, its center of pivotal movement moves progressively rearwardly, thereby causing the pouring slag to be thrown more rearwardly as the pot continues to tilt, thereby ensuring that the molten slag will not drop onto the pneumatic tires. The present invention will be more fully understood when the following portions of the specification are read in conjunction with the accompanying drawings wherein:

FIG. 17 is a plan view of the alternate embodiment of FIG. 11 with the pot in the dumping position.

In FIGS. 1–10 a first embodiment of the pot carrying vehicle of the present invention is shown. The pot carrying vehicle 10 includes a tractor 11 which is pivotally connected to a pot trailer 12 by means of a suitable pivotal connection 13 which is conventional in the art. It is to be noted at this point that while a specialized type of tractor-trailer combination has been disclosed, the present invention may be practiced with any type of vehicle which is suitable.

In accordance with the general intended usage of the pot carrying vehicle of the present invention, pot 14 containing slag is loaded onto pot trailer 12 at a loading area and is hauled by pot carrying vehicle 10 to a dumping area which is a considerable distance away. Pot 14 with its load of slag may weigh as much as 100 tons. In order to minimize injuries to the road by the weight of the vehicle and its load, tractor 11 is supplied with dual wheels mounting pneumatic rubber tires 15 and pot trailer 12 has quadruple tandem wheels mounting rubber pneumatic tires 16. The tire size may be approximately 1300 x 25. As can be seen from FIGS. 1 and 2, the front and rear tires 16 of each set are mounted on suitable axle constructions (not numbered) which include levers having the central portions thereof pivotally mounted at 17 on depending portions 18 of the frame, the front and rear wheels 16 being mounted on opposite ends of said lever. Any other type of suitable axle construction may also be utilized.

Figure 1:
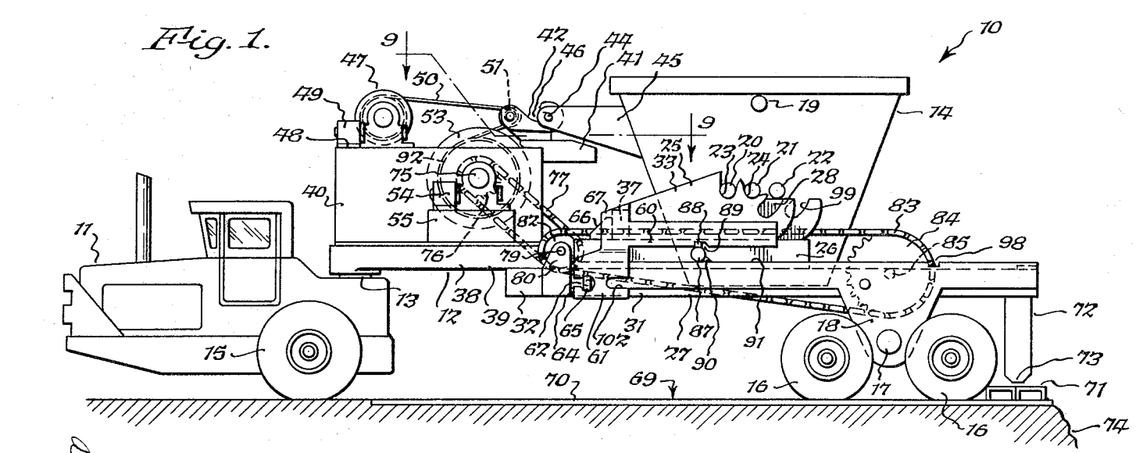
FIG. 1 is a side elevational view of the pot carrying vehicle of the present invention with the pot shown in the position which it occupies immediately after it is loaded and during transit.
Figure 2:
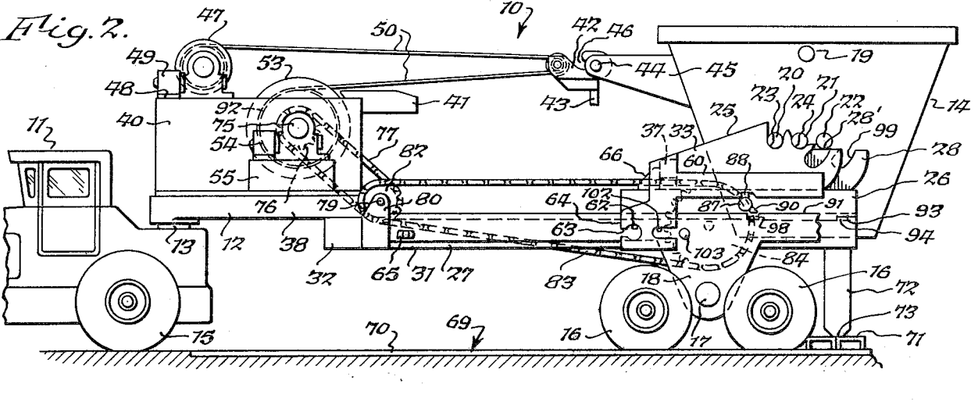
FIG. 2 is a side elevational view similar to FIG. 1 but showing the slag pot moved to a position substantially above the rear wheels of the trailer prior to dumping.

When slag pot 14 is initially loaded onto pot trailer 12 and when pot carrying vehicle 10 is in transit, pot 14 occupies a central position on pot trailer 12, as can be seen from FIG. 1. In this position the weight of the pot 14 and its contents tends to be distributed among both the front and rear tires 15 and 16 in a more equal manner than if the pot 14 occupied a position at the extreme rear end of the pot trailer 12, such as shown in FIG. 2. By virtue of the fact that the weight is distributed in the foregoing manner during loading and while the pot carrying vehicle 10 is in transit to its dumping location, the rear tires are not subjected to a loading which is in excess of their capacity, and further by virtue of the fact that the front tires 15 carry a good portion of the load, their traction with the ground is enhanced.

During the loading of the pot 14 onto pot trailer 12, pot 14 and its slag contents are carried by a crane (not shown) having hooks (not shown) which attach onto opposed pins 19 (FIG. 8) located on opposite outside portions of pot 14. The slag pot 14 also has three pairs of pins 20–20′, 21–21′, and 22–22′ extending from opposite sides of pot 14, the pins of each pair being coaxial. Pins 20 and 21 are received in grooves 23 and 24 of carriage extension 25 which is mounted on carrier 26 which in turn is mounted on side 31 of frame 27 of pot trailer 12. As can be seen from FIGS. 3, 4, and 6, carriage extension 25 is made up of plates 33 and 34 which straddle carrier 26. Furthermore it is to be noted that plate 34 (FIG. 4) has grooves 35 and 36 therein which correspond to grooves 23 and 24, respectively, in plate 33 and that grooves 35 and 36 of plate 34 are in alignment with grooves 23 and 24, respectively, in plate 33. Pin 22 comes to rest on surface 28′ of cam plate 28 (FIG. 5), which is an extension of carrier 26. Thus pin 20 is supported in spaced grooves 23 and 35 of plates 33 and 34, respectively, and pin 21 is supported in spaced grooves 24 and 36 in plates 33 and 34, respectively, while pin 21 is supported on surface 28′ of cam plate 28. At this point it is to be noted from FIG. 8 that a carrier 26′ is mounted on frame portion 31′ in counterpart relationship to carrier 26 which is mounted on frame portion 31. Carrier portion 26′ is a mirror image of carrier 26 and it is deemed that futher description thereof is unnecessary. It is also to be noted at this point that a carriage extension 25′ (FIG. 8) is mounted on carrier 26′, said carriage extension 25′ being mounted in counterpart relationship to carriage extension 25 and being a mirror image thereof. Therefore, description of carriage extension 25′ is deemed unnecessary. Carriage extensions 25′ and 25 are connected to each other by cross brace 37 (FIG. 8) so that said carriage extensions will move in unison as described more fully hereafter. It is also to be noted at this point that frame 27 has two rearwardly extending portions 31 and 31′ which are connected at their forward ends by cross member 32.

It is to be especially noted at this point from FIG. 1, that the center of pot 14 lies on a vertical line through the center of pins 19. Pins 20 and 20′ lie to one side of the center line of pot 14 and pins 22 and 22′ lie on the opposite side of the center line of pot 14. Thus when the pot is mounted so that pins 20, 21, and 22 occupy the above described positions with respect to carriage extension 25 and pins 20′, 21′, and 22′ occupy a similar position with respect to carriage extension 25′, the pot 14 is mounted in an extremely stable manner. However, to insure that there is no possibility whatsoever that either the carriers 26 and 26′ or carriages 25 and 25′ will move rearwardly while the pot carrying vehicle 10 is in transit, a plurality of other locking arrangements are provided. First of all, it is to be noted that a frame extension 38 extends forwardly from cross member 32 at the front of frame members 31 and 31′. Frame extension 38 consists of frame members 39 and 39′ having upwardly extending side walls 40 and 40′, respectively. A platform 41 (FIGS. 1, 9 and 10) extends rearwardly from the top of side walls 40 and 40′ and has a slot 42′ therein with a flared opening 43 extending toward the rear of the pot trailer 12. A latching hook 42 (FIGS. 1 and 2) has a pin 43 extending downwardly therefrom which is received in slot 42′. Normally latching hook 42 occupies a position to the right of that shown in FIG. 1 so that cross pin 44 which extends between brackets 45 and 45′ of pot 14 is received in the opening 46 of latching hook 42 which is located on platform 41 with key 43 resting in slot 42′. After pin 44 is so received, winch 47, which is mounted on platform 48 and is driven by an hydraulic motor 49, is actuated in a counterclockwise direction in FIG. 1 to cause cable 50 to be wound thereon, and in so doing move to the left. However, a central portion of cable 50 encircles pulley 51 (FIG. 8) which is rotatably mounted between bifurcated arm portions 52 and 52′ of latching hook 42, the portion of cable 50 beyond pulley 51 being wound on winch 53 rotatably journalled in opposite sides 40 and 40′ and being mechanically coupled to hydraulic motor 54 mounted on platform 55 extending upwardly from frame member 39. After pin 44 is received in opening 46 of latching hook 42, winch 47 is actuated in the counterclockwise manner as noted above to thereby cause latching hook 42 to travel to the left in FIG. 1 and cause the hook portion 55 thereof to firmly receive pin 44 of pot 14. Again it is to be noted that pin 43 of latching hook 42 is received in slot 42′ of platform 41 and in moving to the position shown in FIG. 1, pin 43 of latching hook 42 engages cross member 56 (FIG. 9) and moves it from the position shown in FIG. 9 to the position shown in FIG. 10 against the bias of springs 57 and 57′ which are interposed between the ends 58 and 58′ of cross member 56 and an abutment (not numbered) within platform 41. Platform 41 is provided with rods 59 and 59′ for guiding movement of cross member 56. Thus latching hook 42 provides an additional supporting arrangement for pot 14 after it is mounted.

Another locking arrangement is provided to prevent carriage extensions 25 and 25′ and carriers 26 and 26′ from moving rearwardly while the vehicle is in transit. In this respect it is to be noted that carriage extension 25, in addition to having plate 33 (FIG. 2) also includes a horizontal rib 60 having a depending ear portion 61, which in turn has an aperture 62 therein which is of circular configuration with a slot 63 leading between aperture 62 and the edge 64 of ear 61. A key 65 is pivotally mounted in frame portion 31 and when key 65 is horizontal, slot 63 will pass over key 65 until the latter is fully contained within aperture 62 and thereafter key 65 can be turned a quarter of a turn to occupy the position shown in FIG. 1, thus locking ear 61 to frame portion 31 against relative movement. It is to be noted at this point that carriage etxension 25' also has an ear portion 61' which correpsonds to ear 61 and is the mirror image thereof. Furthermore a key 65' is mounted on frame member 31' and corresponds to key 65 which is mounted on frame member 31. Keys 65 and 65' may be manipulated manually with a suitable tool or may be motor driven, as desired, to lock ears 61 and 61' to frame members 31 and 31', respectively.

It is to be noted at this point that when the carriage 25–37–25' and carriers 26–26' occupy the position shown in FIG. 1, cross brace 37 of the carriage assembly is in abutting relationship with lugs 66 and 66' mounted on the left ends of carriers 26 and 26', respectively. Furthermore it is to be noted that carriage extension 25 has wing portions 67 and 68 which go around the opposite sides of lug 66 to thereby further stabilize carriage extension 25 relative to carrier 26. A similar construction is provided on carriage extension 25' for receiving lug 66'. It is also noted that a suitable abutment (not shown) is provided to limit movement of carriers 26 and 26' to the left so that when portion 14 is in the position shown in FIG. 1, carriers 26 and 26' have moved as far as they can to the left on frame members 31 and 31', respectively, and carriage extensions 25 and 25' have moved as far to the left on carriers 26 and 26', respectively, that is, until cross member 37 has engaged lugs 66 and 66'. Furthermore, latching hook 42 has moved as far as it can to the left and firmly holds pin 44 of pot 14 so that the latter cannot move to the right. In addition the three pins 20, 21 and 22 and their counterparts 20', 21' and 22' are all firmly supported in the above described manner, so that all of the attachments and locking arrangements enumerated above maintain slag pot 14 firmly mounted on pot trailer 12 in transit.

The slag pot 14 in occupying the above described position while the pot trailer 12 is in transit causes the load thereof to be distributed over the front and rear tires, as described above, to thereby permit pneumatic tires with their cushioning effect to be used to thereby provide greater ease of transportation without damage to the roadways. When the dumping area is reached the pot carrying vehicle 10 is backed up to a dumping dock 69 having a steel plate 70 on the ground for receiving the rear wheels of the trailer 12. In lieu of the steel plate 70, any other rigid surface such as a reinforced concrete surface may be utilized. The purpose of steel plate 70 is to prevent the rear wheels 16 from sinking into the ground when the pot 14 is shifted from the position of FIG. 1 to the position of FIG. 2. Furthermore, a supporting pedestal 71 is provided at the edge of plate 70 and pedestal 71 may be fabricated from two steel channels placed side by side, or from any other rigid material. As can be seen from FIGS. 1, 2 and 3, frame member 31 has a leg portion 72 extending downwardly therefrom. A similar leg portion (not shown) depends downwardly from frame portion 31'. While the pot carrying vehicle 10 is in transit, the bottom edge 73 of leg 72 is sufficiently high above the ground so that it will not contact the ground. Furthermore when the pot trailer 12 is backed into the position shown in FIG. 1 and while the slag pot 14 is centrally located on pot trailer 12, the lowermost portion of leg 72 will clear the upper surface of pedestal 71. However when the slag pot 14 is moved from the position shown in FIG. 1 to the position shown in FIG. 2, the change in weight distribution on pot railer 12 will cause tires 16 to be depressed sufficiently so that rigid leg 72 and its counterpart will engage pedestal 71 which will thus support the rear end of pot trailer 12 against further lowering. Thus the tires 16 will carry only part of the load of pot 14 and its contents, the remainder of the load being transferred through frame 27 into leg 72 and its counterpart to pedestal 71 and into the ground. In other words, the maintaining of the slag pot 14 in a central position on pot trailer 12 during transit so that the load is distributed to both the front and rear tires and the carrying of the weight of the slag bucket by leg 72 and its counterpart when pot 14 is in a dumping position, permit the use of rubber pneumatic tires on pot trailer 12, said tires in turn greatly facilitating the ease with which the pot carrying vehicle 10 may be moved between loading and dumping locations.

It is also to be noted at this point that the reason that a rigid leg 72 and its counterpart were used is to prevent the pot trailer from tilting off of the ground when slag pot 14 is moved to the dumping position shown in FIG. 2.

Figures 3, 4, 5, 6, 7:
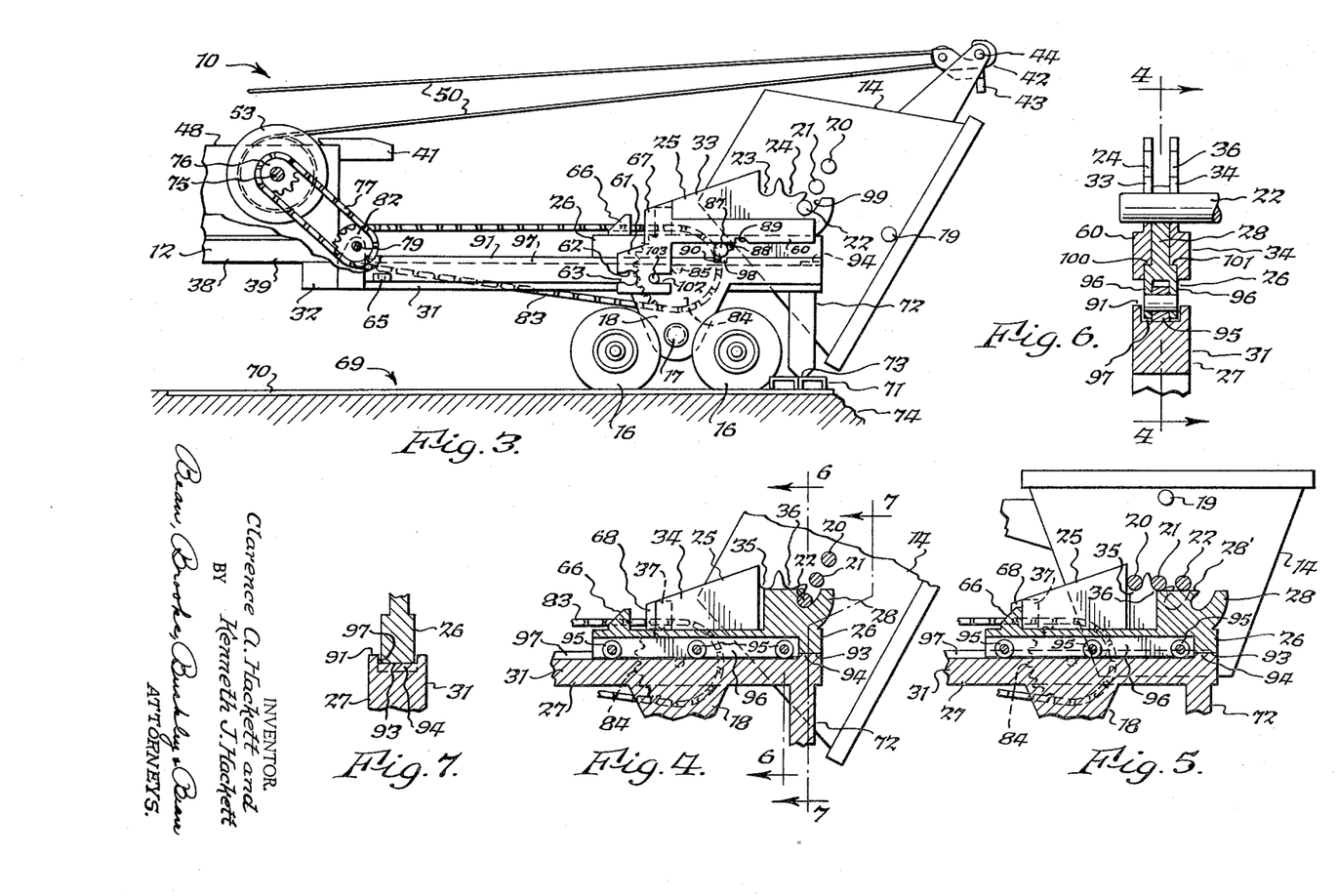
FIG. 3 is a fragmentary side elevational view similar to FIG. 2 but showing the slag pot being dumped.
FIG. 4 is a detail view of the carriage, carrier, and frame of the pot trailer in the dumping position.
FIG. 5 is a view similar to FIG. 4 but showing the slag pot returned to an upright position prior to being moved back to a central position on the trailer.
FIG. 6 is a detail view, partially in cross section, taken substantially along line 6—6 of FIG. 4.
FIG. 7 is a detail view, partially in cross section, taken substantially along line 7—7 of FIG. 4.
Figures 8, 9, 10:
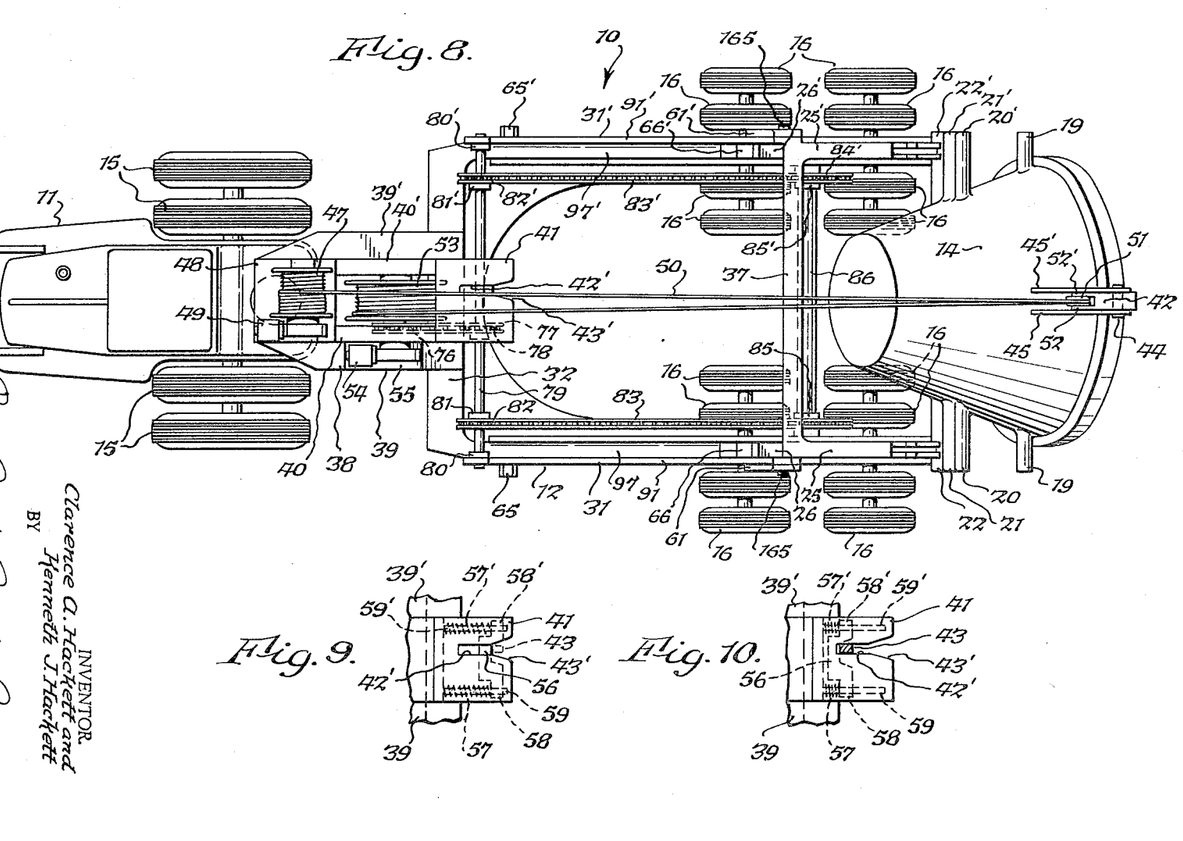
FIG. 8 is a plan view of the pot carrying vehicle of the present invention with the pot in dumping position.
FIG. 9 is a plan view of the latching hook platform, said view being taken substantially along line 9—9 of FIG. 1 with certain parts omitted in the interest of clarity and with the parts of the platform in the position which they occupy when the latching hook is not in latching position.
FIG. 10 is a view similar to FIG. 9 but showing the parts of the latching hook platform in the position which they occupy when the latching hook is in latching position.

The reason that slag pot 14 must be moved to the position shown in FIG. 2 for dumping purposes is to insure that when the pot 14 is tilted to the position shown in FIG. 3 from the position shown in FIG. 2, the molten contents thereof will not splash onto tires 16 or any other part of the vehicle during the pouring of the molten slag over the precipice 74. It will be appreciated that the dumping must be effected at the extreme rear end of pot trailer 12 about an axis transverse to the longitudinal axis of the trailer, and that it would be highly impractical to tilt pot 14 about an axis substantially parallel to the longitudinal axis of the trailer, that is sideways over the trailer because the weight distribution would tend to tip the trailer over.

In order to move slag pot 14 from the transit position shown in FIG. 1 to the dumping position shown in FIG. 2, the following steps are followed: Keys 65 and 65' are moved to a horizontal position to release ears 61 and 61' of carriage 25–37–25'. Hydraulic motor 54 is actuated to rotate shaft 75 of winch 53 in a clockwise direction and thereby cause sprocket 76 to rotate in a counterclockwise direction and thereby cause chain 77 to drive sprocket 78 which is keyed to shaft 79 having opposite end portions journalled in pedestals 80, 81, 80' and 81' extending upwardly from the frame 27. The clockwise rotation of sprocket 76 will cause a corresponding clockwise rotation of sprocket 78 with a corresponding clockwise rotation of shaft 79. Sprockets 82 and 82' are keyed to shaft 79 and drive chains 83 and 83' which encircle sprockets 82 and 82', respectively, and are driven thereby also encircle sprockets 84 and 84', respectively, which idle on stub shafts 85 and 85', respectively, a shaft 86 extending between said stub shafts. The upper runs of chains 83 and 83' are fixedly attached to cross member 37 of carriage 25–37–25' so that as said upper runs move toward the rear in response to the clockwise rotation of sprockets 82 and 82', there will be a tendency to move carriage 25–37–25' to the rear of the pot trailer 12. However, carrier 26 has a dog 87 pivotally mounted thereon with an upper tooth 88 fitting within notch 89 in horizontal rib 60 of carriage extension 25 and a lower tooth 90 slidable on shelf 91 (FIGS. 1, 6 and 7) of frame member 31. A dog, which is the mirror image of dog 87, is associated with carriage extension 25' in the same manner. Because of the position which dog 87 and its counterpart occupy, as shown in FIG. 1, as carriage 25–37–25' is moved rearwardly by chains 83 and 83', carriers 26 and 26' will be locked to said carriage extensions and move rearwardly therewith.

It will be noted that the diameter of the drum 92 of winch 53 is twice the diameter of sprocket 76 and that sprocket 82 is the same diameter as sprocket 76. Therefore for every rotation of sprocket 76 an amount of cable 50 will be uncoiled therefrom which is twice the circumference of sprocket 76. Since cable 50 encircles pulley 51 of latching hook 42 in the manner shown in FIG. 1, as pot 14 travels rearwardly a distance $x$ and an amount of cable $2x$ is uncoiled from drum 92 of winch 53, cable 50 will remain taut as pot 14 is moved rearwardly, thereby maintaining its stabilizing effect throughout the rearward movement of said pot. It will be appreciated that winch 47 remains stationary during the above described operation of winch 53.

The foregoing rearward movement of pot 14 will continue in response to the combined rearward movement of carriage 25–37–25′ and carriers 26 and 26′ until such time as the cut-away end 93 of carrier 26 rides up on step 94 of frame portion 31 and the step 94 acts as a positive stop for carrier 26. A similar step arrangement is provided relative to frame portion 31′ and carrier 26′. It is to be noted at this point that a plurality of rollers 95 (FIGS. 4, 5 and 6) are rotatably mounted between the bifurcated leg portions 96 of carrier 26 and these rollers ride in the track 97 provided by leg portion 31 of frame 27. A similar roller arrangement is provided relative to carrier 26′. These roller arrangements reduce the power requirements of motor 54 and generally enhance the ease by which pot 14 may be moved to the rear of pot trailer 12.

After pot 14 reaches the position shown in FIG. 2 wherein downwardly extending tooth 90 of dog 87 lies above notch 98 in ledge 91 of frame member 31 (and after the dog associated with carrier 26′ reaches a similar relationship with respect to frame member 31′), and after movement of carriers 26 and 26′ have stopped, as described above, continued movement to the right of upper runs of chains 83 and 83′ will cause carriage 25–37–25′ to continue to move to the right from the position in FIG. 2 to the position shown in FIG. 3 because notch 98 will receive the tooth 90 of dog 87 to thereby permit tooth 88 to move out of notch 89 and thereby unlock carriage extension 25 from carrier 26. However, it will be noted that cam plate 28 forms an integral part of carrier 26 and will therefore stop when the latter stops. Therefore the continued movement of carriage extensions 25 and 25′ will cause pin 22 to move from a position in FIG. 2 wherein it is resting on surface 28′ to a position wherein it lies directly above groove 99 (FIG. 2) in cam plate 28 and may be received therein. Pin 22′ occupies a similar relationship with the counterpart of cam 28 associated with carrier 26′. The final movement of pot 14 from the position shown in FIG. 2 to an upright position in FIG. 3 is effected by virtue of relative movement between carriage 25–37–25′ and carriers 26 and 26′. This final movement is effected by a sliding of shoulders 100 and 101 (FIG. 6) of carriage 25 on the mating shoulders (not numbered) of carrier 26. The foregoing relative sliding movement will continue until such time as slot 102 in ear 61 of carrier extension 25 rides onto pin 103 extending laterally from frame member 31. A counterpart to pin 103 extends from frame member 31′.

After pot 14 has reached a position to the right to that shown in FIG. 2 wherein pin 22 overlies slot 99 and may be received therein, motor 49 is actuated to rotate winch 47 in a clockwise direction to thereby provide slack to cable 50. Pot 14 being unbalanced will tilt rearwardly to the position shown in FIG. 3 to thereby dump slag over precipice 74, the amount of tilting being controlled solely by controlling the tension on cable 50. The selective unbalance of pot 14 is achieved by the unique manner in which pins 20–20′, 21–21′, and 22–22′ are mounted. More specifically, as can be seen from FIG. 1, pins 20–20′ and 21–21′ are to the left of the center line of pot 14. Therefore when pin 22 overlies slot 99 of cam 28, the center of gravity of pot 14 will be the the right of pins 21 and 21′. Therefore pot 14 will tilt in a clockwise direction about pins 21–21′ because pin 22 may now enter slot 99. The foregoing pivotal movement may continue until pin 22 is seated in the bottom of slot 99, as shown in FIG. 3. At this time pins 20 and 21 will have moved out of the slots or grooves in which they were previously located and the center of rotation for pot 14 will now be about pins 22–22′ which are to the right of the center line of pot 14. However, clockwise tilting of pot 14 will still continue because the previous movement of pot 14 has shifted its center of gravity so as to lie to the right of pin 22–22′. This not only does pot 14 tilt rearwardly because of its own unbalance but in so doing the center of pivotal movement moves toward the rear of the pot trailer 12 to thereby cause pot 14 to move over and out away from the rear of the trailer during the dumping action to thereby insure that the lip of pot 14 is sufficiently far beyond the end of the trailer so that slag cannot pour onto rubber tires 16.

It is to be noted that if it is desired to bump pot 14 during the dumping process, it is merely necessary to rapidly reverse motor 49 to thereby reverse the direction of rotation of winch 47. In this manner, by effecting a rapid series of reversals, pot 14 may be pivoted back and forth to jar slag loose.

After dumping has been completed and pot 14 is empty, it is returned to an upright position shown in FIG. 2 from the position shown in FIG. 3 by causing motor 49 to effect counterclockwise rotation of winch 47. After pot 14 reaches an upright position, motor 49 is stopped and motor 54 is actuated to effect counterclockwise rotation of winch 53 and this will cause carriage extensions 25 and 25′ to move rearwardly from the position shown in FIG. 3 to the position shown in FIG. 2 wherein cross member 37 of carriage 25–37–25′ moves into abutting engagement with lugs 66 and 66′. It is to be noted that carriers 26 and 26′ are held against forward movement during the forward movement of the carriage because the lower tooth 90 of dog 87 will be caused to remain in notch 98 in ledge 91 because of the fact that upper dog 88 is held against the underside of rib 60 until such time as it can rotate upwardly into notch 89 (see FIG. 3).

After tooth 88 moves into notch 89, continued movement to the left of upper runs of chains 83 and 83′ will cause substantially rectilinear movement of the carriage and the carriers to the left in unison until such time as key 43 of latching hook 42 is received in diverging portion 43′ of platform 41 and rides toward slot 42′ an amount which is sufficient to cause latching hook 42 to come to rest on platform 41 in the position shown in FIG. 1. At this point action of motor 54 is stopped. It will be noted that the takeup of winch 53 is such that it causes cable 50 to be taken in at twice the rate of travel of pot 14 to thereby cause cable 50 to remain taut. After ears 61 and 61′ of carrier extensions 25 and 25′, respectively, have reached the position shown in FIG. 1, keys 65 and 65′ are rotated from their horizontal position to the vertical position shown in FIG. 1 to thereby firmly lock the carriage to the frame members 31 and 31′. It is also to be noted at this point that ears 61 and 61′ extend downwardly over the outside edge portions of frame members 31 and 31′, respectively, and thus ear portions 61 and 61′, in addition to performing their above enumerated functions, also act as guides to cause perfectly retilinear travel of carriage 25–37–25′ longitudinally of the trailer 12.

After pot 14 has been moved to its central position on pot carrying vehicle 10, the latter may be driven back to the loading area with empty pot 14. After it has come back to the loading area, motor 49 is actuated to cause winch 47 to move slowly in a clockwise direction in FIG. 1. This will cause cable 50 to be played out from winch 47 and the compressed springs 57, 57′ (FIG. 10) will expand to move across member 56 from the position shown in FIG. 10 to the position shown in FIG. 9 to cause latching hook 42 to move to the right on platform 41 until such time as the open portion 46 of the latching hook 42 lies above pin 44 of pot 14. Thereafter the crane (not shown) may be brought into play to engage pins 19 on opposite sides of pot 14 to lift said pot from the trailer. Thereafter another pot which is full of slag may be again mounted on trailer 12 in the above described manner.

At this point, it is to be again noted that in both the foregoing and following parts of the description, there are portions of the vehicle which occupy a counterpart relationship to each other. At points of the description where the function of only one of the counterparts is described, it will be appreciated that the other of the counterparts functions in the same manner.

In FIGS. 11–17 an alternate embodiment of the present invention is disclosed. The pot carrying vehicle 110 includes a tractor 111 and a pot trailer 112 pivotally secured thereto at 113 in the same manner as described above with respect to FIGURES 1 to 10. Tractor 111 has pneumatic tires 114 and trailer 112 has pneumatic tires 115, the pneumatic tires providinng the advantages enumerated above with respect to FIGURES 1 to 10. Tires 115 may be mounted in the same manner as described above with respect to tires 16 of FIGURE 8.

Figure 11:
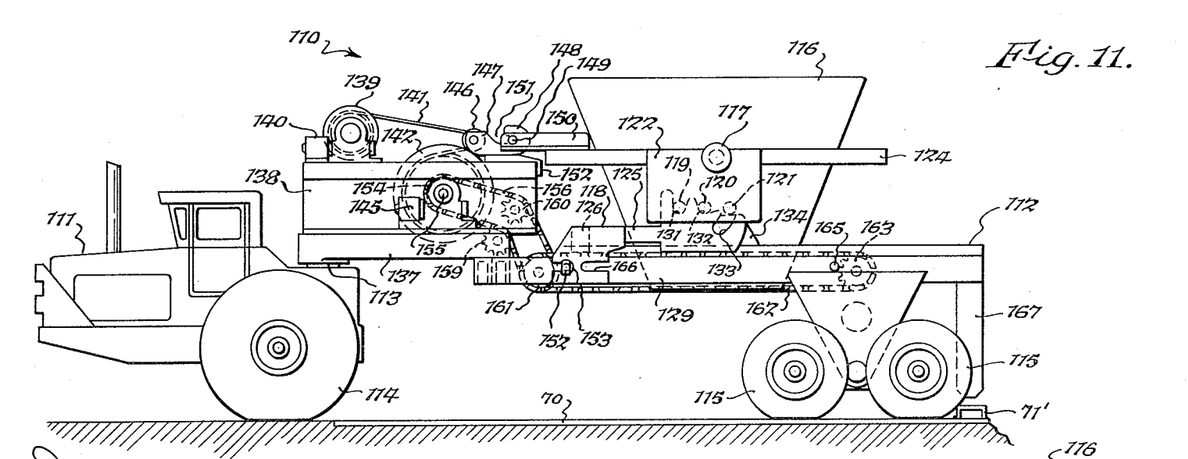
FIG. 11 is a side elevational view of an alternate embodiment of the pot carrying vehicle of the present invention with the pot in the position which it occupies both immediately after loading and while the vehicle is in transit.

In order to mount slag pot 116 on to trailer 112, it is carried by a crane which engages pins 117 and seats pot 116 down on carriage 118 so that it occupies the position shown in FIGURE 11. More specifically, pot 116 has three pairs of pins 119–119', 120–120' and 121–121'. Pins 119, 120 and 121 extend between plates 122 and 123 extending downwardly from rim 124 (FIGURE 17). Pins 119', 120' and 121' extend between plates 122' and 123' extending downwardly from rim 124. Plates 122' and 123' occupy a counterpart relationship with respect to plates 122 and 123, respectively.

Carriage 118 has arms 125 and 125' extending rearwardly in counterpart relationship from cross brace 126 which joins them. Arm 125' (FIGURE 16) has an inverted V-shaped groove 127' which is mounted in complementary relationship on a like-shaped track 128' which forms the upper surface of frame portion 129'. Frame portion 129 (FIGURE 17) is the counterpart of frame portion 129' and has a surface 128 which is the same as surface 128' of frame portion 129'. Frame portions 129 and 129' are connected to each other at the front of trailer 112 by yoke member 130. It will be appreciated that rearwardly extending arm 125 is mounted on frame 129 in the same manner described above with respect to its counterpart, arm 125'.

Figure 14:
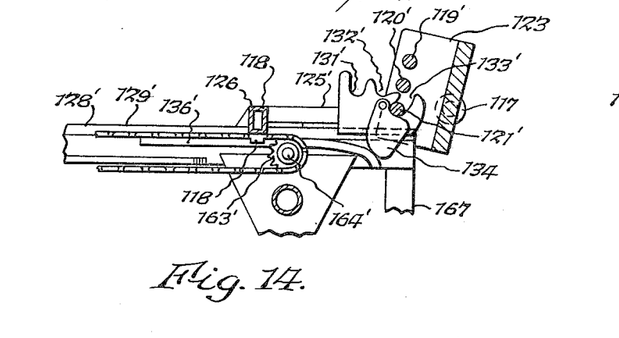
FIG. 14 is a detail view of the carriage for the pot and associated structure in the dumping position, this view being taken along line 14—14 of FIG. 17.
Figure 15:
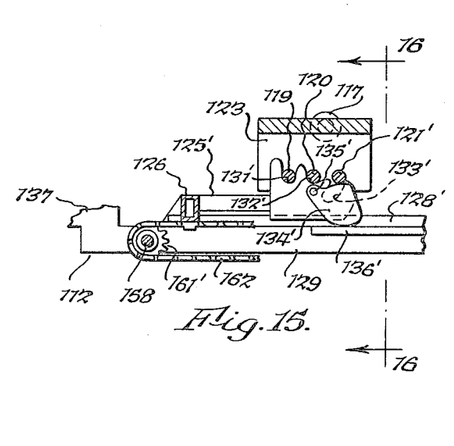
FIG. 15 is a view of the structure associated with the pot carriage but showing the position which it occupies immediately after dumping has been effected while the carriage is en route to its central position on the trailer.

Carriage arm 125 (FIGURES 11 and 13) has grooves 131, 132 and 133 therein. Arm 125' has grooves 131', 132' and 133' (FIGURES 14 and 15). After pot 116 is mounted, pins 119 and 120 are received in grooves 131 and 132 (FIGURE 11). Pins 119', 120' are received in grooves 131' and 132' (FIGURE 15). Arm 125' (FIGURE 15) has a cam 134' pivotally mounted on the inside surface thereof by pin 135'. Arm 125 mounts a similar cam 134 (FIGURE 11). The lower surface of cam 134' rides on track 136' and cam 134 is associated with arm 125 in counterpart relationship to cam 134'. The upper surfaces of cam 134' and its counterpart 134 support pins 121' and 121, respectively, when carriage 118 is in the position shown in FIGURE 11. Thus pins 119, 120, 119' and 120' are received in grooves 131, 132, 131' and 132', respectively, and pins 121' and 121 rest on the top surfaces of cams 134' and 134, respectively. As can be seen from FIGURE 11, pins 119 and 119' are to one side of the vertical center line of pot 116 and pins 121 and 121' lie on the other side of the vertical center line of pot 116. Thus when pot 116 is supported on arms 125 and 125' in the above described manner it is stabilized against tilting because of the location of the pins on opposite sides of the center line.

The front portion of trailer 112 is formed into a frame 137 having a pedestal 138 thereon which mounts winch 139 which is driven by hydraulic motor 140. A cable 141 extends from winch 139 to winch 142 which has the opposite ends thereof journalled in upwardly extending plates 143 and 144 (FIG. 17) and is driven by a hydraulic motor 145 mounted on frame 137. The center portion of cable 141 encircles pulley 146 which is journalled on bifurcated end portion 147 of latching hook 148. During the seating of pot 116 down onto carriage arms 125 and 126 latch hook 148 occupies a position to the right of that shown in FIGURE 11 so that pin 149 carried by bifurcated arm portion 150 of pot 116 is received in the opening 151 of the latching hook which may be identical in construction to latching hook 42 of FIGURES 1 to 10 and therefore will not be further described. Latching hook 148 is mounted on a platform 152 which may be identical to platform 41 of FIGURES 1 to 10 and will therefore not be further described. After pin 149 is received in opening 151, hydraulic motor 140 is actuated to cause winch 149 to rotate in a counterclockwise direction in FIGURE 11 to thereby pull latching hook 148 to the position shown in FIGURE 11 and thereby cause pin 149 to be firmly seated in the hook portion of hook 148. Hook 148 will thus stabilize pot 116 while pot carrying vehicle 110 is in transit.

It will also be noted that frame portion 129 has a key 152 extending laterally therefrom which is received in aperture 153 in arm 125. Key 152 and its counterpart 152' (FIGURE 17) act in the same manner as keys 65 and 65' (FIGURE 8) and a further description thereof will not be made since it is deemed superfluous.

Thus a load of slag in pot 116 is mounted on pot carrying vehicle 110 in the above described manner and the vehicle is driven to the dumping area which has a plate 70 and a pedestal 71' which may be identical or analogous to plate 70 and pedestal 71 of FIGURE 3 and which operate in the same manner.

After the pot carrying vehicle 110 is parked in the position shown in FIGURE 11, keys 152 and 152' are turned to a horizontal position so that carriage 118 may be moved to the right from the position shown in FIGURE 11. More specifically, to effect movement of carriage 118, motor 145 is actuated to drive winch 142 in a clockwise direction and thereby cause cable 141 to be played out. Furthermore, the rotation of winch 142 in a clockwise manner will cause sprocket 154 which is mounted on the winch shaft 155 journalled in plates 143 and 144 to also rotate in clockwise direction and drive chain 156 which extends between sprocket 154 and sprocket 157 keyed to shaft 158 which in turn is journalled between frame portions 129 and 129'. Idler sprockets 159 and 160 (FIGURE 12) change the direction of chain 156, as shown. Causing sprocket 157 to rotate in a clockwise direction in turn causes sprockets 161 and 161' (FIGURE 17) to also rotate in a clockwise direction in FIGURE 11 because they are also mounted on shaft 158. Chains 162 and 162' (FIGURE 17) encircle sprockets 161 and 161' at their left ends and encircle sprockets 163 and 163' at the right ends, sprockets 163 and 163' being suitably journalled on the frame of the vehicle, as by stub shafts 164 and 164', respectively. The foregoing rotation of shaft 158 will cause the upper runs of chains 162 and 162' to move to the right and cause carriage 118 to move to the right also because the upper runs of said chains are fixedly secured to cross brace 126 of carriage 118 at 118' (FIG. 14).

Figure 12:
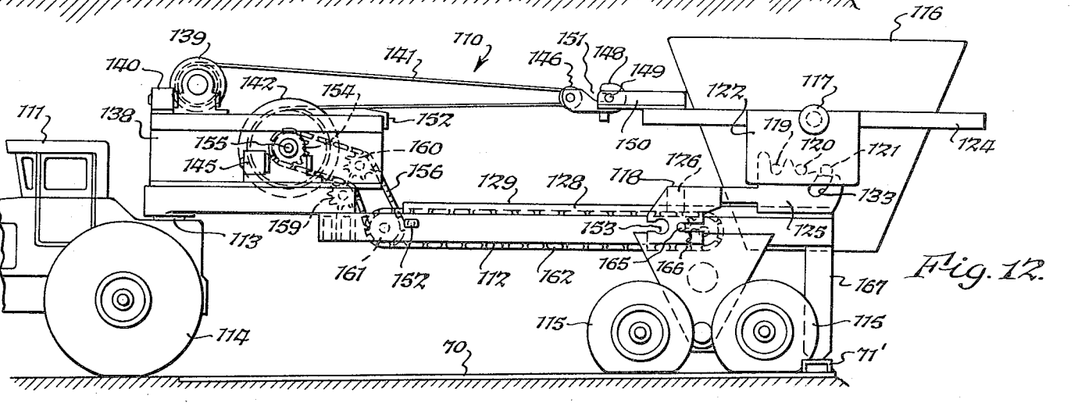
FIG. 12 is a side elevational view similar to FIG. 11 but showing the slag pot in position substantially above the rear trailer wheels immediately prior to dumping.
Figure 13:
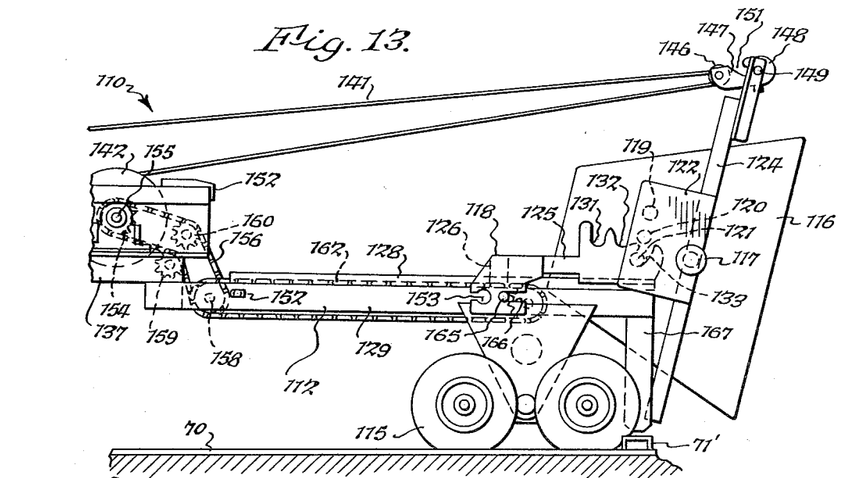
FIG. 13 is a fragmentary side elevational view of the trailer with the pot in the dumping position.
Figure 16:
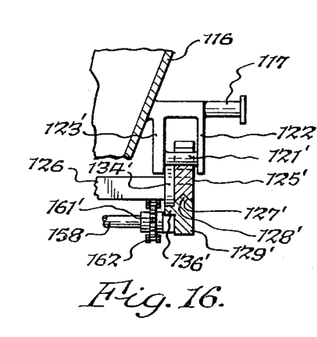
FIG. 16 is a detail view taken substantially along line 16—16 of FIG. 15.

In moving from the position shown in FIGURE 11 to the position shown in FIGURE 12 carriage arms 125 and 125' slide on frame members 129 and 129', respectively, because they both have the structure such as shown in FIGURE 16. Furthermore, it is to be noted that the drum of winch 142 has a diameter which is twice the diameter of sprocket 154 which in turn has the same diameter as sprockets 157, 161 and 161'. Thus, the cable 141 will be played off of the drum of winch 142 at twice the linear rate of rearward travel of carriage 118 and thus cable 141 will remain taut througout the rearward movement of pot 116 from the position shown in FIGURE 11 to the position shown in FIGURE 12 to thereby cause pot 116 to remain stabilized.

The rearward movement of pot 116 will continue until such time as it reaches the position shown in FIGURE 12 at which suitable positive stops 165 and 165' will terminate the rearward movement of carriage 118 when they are fully received in slots such as 166 of carriage arm 125 and 125'.

It will be noted that throughout the rearward travel of carriage 118, cams 134 and 134' ride on the cam tracks 136 and 136'. During the initial portion of such travel cams 136 and 136' are perfectly straight, as shown in FIGURE 15, and thus the upper surface of the cams which ride thereon will support pins 121 and 121'. However, as can be seen from FIGURE 14, the rear portion of cam tracks 136 and 136' is curved downwardly so that when cariage 118, cams 134 and 134' ride on cam tracks 136 URE 12, cam 134' (and its counterpart 134) will have moved to the position shown in FIGURE 14 and therefore no longer provide support for pins 121 and 121'.

At this point it is to be noted that once cams 134 and 134' have rotated away from their supporting positions, pot 116 will tend to tilt rearwardly because of its own weight inasmuch as pins 119 and 120 (and their coaxial counterparts) now lie to one side of the vertical center line of pot 116. The only structure which prevents such rearward pivotal rotation is cable 141. In order to effect dumping of pot 116 and thus dispose of its slag contents, motor 140 is actuated to cause winch 139 to rotate in a clockwise direction to thereby play out cable 141 and thus control the rate at which pot 116 tilts from the position shown in FIGURE 12 to the position shown in FIGURE 13. Furthermore, it is to be noted that as the pot 116 tilts progressively from the position shown in FIGURE 12 to the position shown in FIGURE 13 its center of pivotal action moves from pins 120–120' to pins 121–121' and thus a rearward movement of pot 116 accompanies its pivotal movement, said rearward movement insuring not only that the slag will not be poured onto pneumatic tires 115 but also insuring that rim 124 which surrounds pot 116 will clear the rear of trailer 112.

It is to be noted at this point that the rear of trailer 112 is supplied with downwardly extending leg portions 167 which are analogous in all respects to leg portions 72 of FIGURES 1 to 10 and serve the same function, namely, to cause the rear end of trailer 112 to be supported on pedestal 71' because it is lowered thereon as tires 115 tend to flatten when the pot is moved to a position above them. Legs 167 may be located on opposite sides of trailer 112 so that they depend from frame portions 129 and 129'. Instead of the rigid legs 167 shown, the legs may be powered by hydraulic motors so that after trailer 112 is in position the hydraulic motor may be actuated to lower the legs into engagement with the support pedestal. A similar construction may be utilized with respect to FIGURES 1 to 10 if desired. It will be noted at the present time that after the load of slag has been dumped from pot 116 the tires will not be as flat as they were in FIGURE 12 and therefore legs 167 will rise from pedestal 171'. While not specifically stated relative to FIGURES 1 to 10, the same action takes place with this embodiment.

During the process of dumping pot 116, winch motor 140 may be rapidly reversed to cause pot 116 to be "knocked" to thereby cause slag which sticks therein to dump therefrom. After the slag is entirely dumped, winch 139 is caused to rotate in a counterclockwise direction to roll in cable 141 and therefore cause pot 116 to move from the position shown in FIGURE 13 to the position shown in FIGURE 12. Thereafter winch 139 is stopped and winch 142 is actuated in a counterclockwise direction to cause the upper runs of chains 162 and 162' to move to the left in FIGURE 12 and thereby cause pot 116 to travel from its position shown in FIGURE 12 to its position shown in FIGURE 11. After carriage 118 reaches the position shown in FIGURE 11, keys 152 and 152' are rotated a quarter turn to the position shown in FIGURE 11 to thereby lock carriage 118 into position.

Thereafter pot carrying vehicle 110 is driven from the dumping area to the loading area where winch 139 is rotated in a clockwise direction to cause latching hook 148 to be moved to a position wherein its open portion 151 overlies pin 149 so that the crane (not shown) may engage pins 117 to remove pot 116 from the trailer, and thereafter place another pot therein.

The embodiment of FIGURES 11 to 17 achieves the same general objectives as does the embodiment of FIGURES 1 to 10, namely, that it permits a massive load consisting of a slag pot and its contents to be carried on a vehicle having pneumatic rubber tires which not only provide a good cushioned ride and are not destructive of the roadways but also enhance the maneuverability of the vehicle.

While preferred embodiments of the present invention have been disclosed, it will be understood that the present invention is not limited thereto but may be otherwise embodied.

What is claimed is:

1. A pot carrying vehicle comprising a frame, rear wheels on said frame, means on said frame for receiving a pot in mounted relationship at a first position which is relatively remote from said rear wheels, means for moving said pot to a second position substantially above said rear wheels when it is desired to effect bumping of said pot, pivot means for mounting said pot in an off-center manner so as to tend to cause said pot to tilt rearwardly by virtue of its own unbalance, locking means for normally locking said pot against tiltiing rearwardly about said pivot means when said pot is in said first position, means for removing said locking means from normal locking position to thereby cause said pot to tilt rearwardly about said pivot means solely by virtue of its own unbalance when said pot is in said second position, and means forming a part of said pivot means to cause the center of pivotal movement of said pot to progressively move rearwardly while maintaining said unbalance as said pot is tilted progressively more during dumping to thereby insure that the contents of said pot are dumped beyond said rear wheels while said dumping is effected by causing said pot to tilt solely by its own unbalance.

2. A pot carrying vehicle comprising a frame, rear wheels mounted on said frame, means on said frame for receiving a pot in mounted relationship at a first position which is relatively remote from said rear wheels, latching means occupying a first position for engaging said pot during the mounting of said pot and occupying a second position after the mounting of said pot to lock said pot against movement and thereby cause said pot to remain in said first position during movement of said vehicle, a cable attached to said latching means, said cable extending away from said pot in a direction which is also away from said rear wheels, means for moving said pot to a second position which is substantially above said rear wheels for dumping, cable moving means for playing out said cable at the same rate as the rearward movement of said pot between its first and second positions to thereby cause said latching means to maintain said pot stabilized by virtue of maintaining said cable taut, mounting means for permitting the weight of said pot to effect the rearward tilting thereof when said pot is located in said second position as permitted by the amount said cable which is played out to thereby effect the dumping of said pot by its own unbalance with the rate of dumping being controlled by the amount of playing out of said cable, and means for moving said cable in opposite directions for the purpose of pivoting said pot back and forth in opposite directions to thereby loosen the contents thereof during dumping.

3. A pot carrying vehicle comprising an elongated frame having front and rear portions, rear wheels mounted proximate said rear portion of said elongated frame, first motor means mounted on said frame, a pot carrier mounted intermediate said front and rear portions of said frame for receiving a pot in mounted relationship, a latching hook, cable means operatively coupling said latching hook to said first motor means, said latching hook occupying a first position to receive a portion of said pot during the mounting thereof on said carrier and being movable by said first motor means to a second position for latching said pot in position on said carrier, second motor means for moving said carried rearwardly toward said rear wheels on said elongated frame to cause said pot to occupy a second position substantially above said rear wheels for dumping, winch means for causing said cable to play out at a rate which will cause said cable to remain taut during movement of said carrier rearwardly to said second position by said second motor means, and means for pivotally mounting said pot in an unbalanced manner when said pot occupies said second position to thereby tend to cause said pot to tilt rearwardly by virtue of its own unbalance, said first motor means including means for varying the effective length of said cable extending between said winch means and said latching hook to thereby control the amount of tilting of said pot during dumping.

4. A pot carrying vehicle comprising a frame having front and rear wheels, pneumatic tires on said front and rear wheels, a carriage on said frame, means on said carriage for receiving a pot in mounted relationship, means on said frame for effectively locking said carriage in a first position which is located between said front and said rear wheels to cause the weight of said pot to be distributed between said front and said rear wheels, motor means operatively associated with said frame for supportsaid carriage and said pot mounted thereon rearwardly to a second position substantially above said rear wheels, means opeartively associated with said frame for supporting said frame above the ground when said carriage is in said second position to thereby prevent the weight of said pot from being borne entirely by said rear wheels, means for tiltiing said pot rearwardly when said pot is in said second position to thereby effect the dumping of the contents thereof, said means on said carriage for receiving said pot in mounted relationship including first and second pairs of aligned grooves in said carriage, first and second pairs of pins extending laterally from opposite sides of said pot, said first pair of aligned pins being located to one side of the vertical center line of said pot toward the front of said vehicle and said second pair of aligned pins being located on the opposite side of the vertical center line of said pot toward the rear of said vehicle, said first pair of aligned pins being received in said first pair of grooves when said carriage is in said first position, support means associated with said carriage for providing a support for said second pair of pins while said carriage is in said first position and is in transit between said first and said second positions, and means for withdrawing said support means after said pot reaches said second position to thereby permit said pot to pivot rearwardly about said first set of pins.

5. A pot carrying vehicle as set forth in claim 4 wherein said second pair of aligned grooves receives said second pair of aligned pins during the rearward tilting of said pot and wherein said first set of aligned pins moves outwardly from said first pair of aligned grooves to thereby cause the center of pivotal movement of said pot to move progressively rearwardly on said vehicle as said pot tilts rearwardly.

6. A pot carrying vehicle comprising a frame having rear wheels, pneumatic tires on said rear wheels, a carriage on said frame, off-center pivot means for mounting said pot on said carriage, means on said frame for effectively locking said carriage in a first position which is located between said front and rear wheels to cause the weight of said pot to be distributed between said front and said rear wheels, motor means operatively coupled to said carriage for moving said carriage and said pot mounted thereon rearwardly to a second position substantially above said rear wheels, stabilizing means for preventing said pot from pivoting about said off-center pivot means while said carriage is in said first position and is in transit between said first and said second positions, means for rendering said stabilizing means ineffective when said carriage is in said second position to thereby permit said pot to tilt rearwardly by its own weight about said off-center pivot means for dumping the contents thereof, and means operatively coupled to said pot for controlling the rate at which said pot tilts rearwardly.

7. A pot carrying vehicle as set forth in claim 6 including means operatively associated with said off-center pivot means for moving the center of pivotal movement of said pot progressively rearwardly incidental to increased tilting of said pot while causing said pot to continue to tilt rearwardly by its own weight.

8. A pot carrying vehicle comprising a frame, front and rear wheels for supporting said frame, pneumatic tires on said front and rear wheels, first sprocket means on said frame proximate said front wheels, second sprocket means on said frame proximate said rear wheels, chain means encircling said front and rear sprocket means, a carriage, roller means for mounting said carriage for movement longitudinally on said frame, means for affixing said chain means to said carriage, motor means operatively coupled to said first and second sprocket means for effecting movement of said chain means about said first and second sprocket means and for causing said carriage to move longitudinally on said frame between a first position centrally on said frame to a second position substantialy above said rear wheels, said carriage including spaced arms extending longitudinally of said frame, aligned groove means located in said arms for receiving pivot means mounted on opposite sides of said pot, stabilizing means operatively associated with said carriage for preventing said pot from tilting while it is in said first position and while it is in transit between said first and said second positions, means for rendering said stabilizing means ineffective when said carriage is in said second position, and means operatively coupled to said pot for causing said pot to pivot at a controlled rate rearwardly about said pivot means to thereby effect dumping thereof.

9. A pot carrying vehicle as set forth in claim 8 including legs depending downwardly from the rear of said frame for effectively engaging the ground when said pot is in said second position to thereby prevent the entire load of said pot from being borne by said rear tires.

10. A pot carrying vehicle as set forth in claim 8 wherein said pivot means are effectively mounted off-center on said pot for causing said pot to tend to pivot rearwardly by its own unbalance, said means operatively coupled to said pot for causing said pot to pivot at a controlled rate rearwardly about said pivot means including cable means coupled to the upper portion of said pot facing the front of said vehicle, and winch means for causing said cable to be played out at a controlled rate to thereby determine the rate of pivoting of said pot due to its own unbalance.

11. A pot carrying vehicle as set forth in claim 10 wherein said pivot means includes forward and rearward pivot points extending from a front portion of said pot and a more rearward portion thereof and means on said carriage means for causing the point of pivotal movement of said pot to shift from said forward pivot points to said rearward pivot points incidental to the rearward tilting of said pot.

12. A slag pot carrying vehicle for carrying a massive load consisting of a slag pot and its contents of flowable slag comprising a frame having a front portion and a rear portion, rear wheels on said frame proximate said rear portion, pneumatic tires on said rear wheels, a carriage, means on said carriage for removably mounting said pot, track means on said frame, means mounting said carriage for substantially rectilinear movement relative to said track means, motor means for driving said carriage between a first position and a second position on said track means, said first position being remote from said rear portion of said frame and being located substantially to one side of said rear wheels between said front and rear portions of said frame, said second position being closer to said rear portion of said frame and substantially overlying said rear wheels, means for effectively holding said carriage in said first position during transit of said vehicle, said slag pot and its contents exerting less of a loading force on said pneumatic tires when said carriage is in said first position then when said carriage is in said second position, and means coupled to said pot for effecting tilting of said pot rearwardly beyond said rear portion of said frame when said carriage is in said second position to effect dumping of the contents of said pot beyond said rear wheels.

13. A slag pot carrying vehicle as set forth in claim 12 including means on said frame in the vicinity of said wheels for supporting said frame above the ground when said carriage is located in said second position to thereby limit the force which said slag pot and its contents can exert on said pneumatic tires.

14. A slag pot carrying vehicle as set forth in claim 13 wherein said means on said frame comprise fixed rigid leg means depending downwardly from said rear portion of said frame for effectively engaging the ground and therefore providing a support for holding said frame above the ground when said pneumatic tires flatten incidental to the movement of said carriage to said second position.

15. A slag pot carrying vehicle as set forth in claim 14 in combination with a rigid support means on the ground for receiving said read wheels to thereby obviate the possibility of said rear wheels sinking into the ground when said carriage is in said second position, said rigid support means being of an area which is greater than the area of the portion of said pneumatic tires which is normally in engagement with the ground, and an elevated pedestal mounted on the ground in the vicinity of said support means for receiving said fixed rigid leg means in supporting relationship, said fixed rigid leg means having lowermost portions which are sufficiently high above the ground so as not to engage the ground when said vehicle is in transit with said carriage in said first position.

References Cited by the Examiner
UNITED STATES PATENTS

| | | | |
|---|---|---|---|
| 2,190,869 | 2/1940 | Frentzel et al. | 298—14 |
| 2,294,354 | 8/1942 | Guignard | 298—38 |
| 2,313,514 | 3/1943 | Brooks. | |

FOREIGN PATENTS 749,062  11/1944  Germany.

ROBERT B. REEVES, *Primary Examiner.*

LOUIS J. DEMBO, *Examiner.*

N. L. STACK, *Assistant Examiner.*